Dec. 8, 1925. 1,565,172
L. P. C. LOTTE
TIRE PROTECTOR
Filed May 20, 1924 2 Sheets-Sheet 1
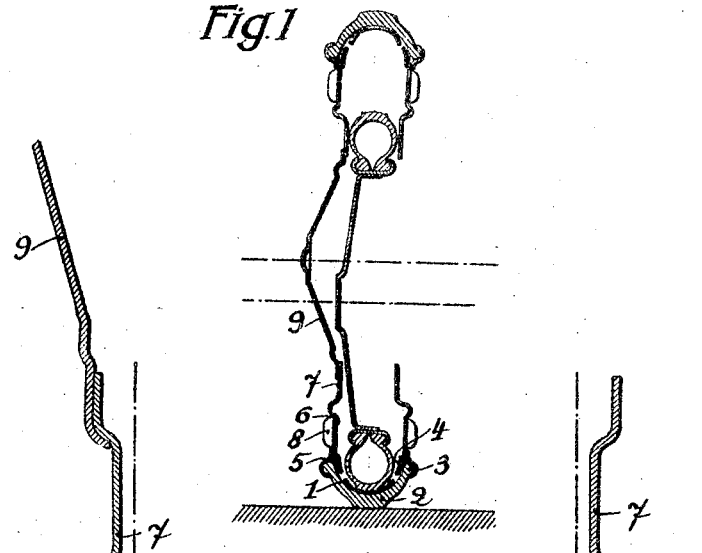
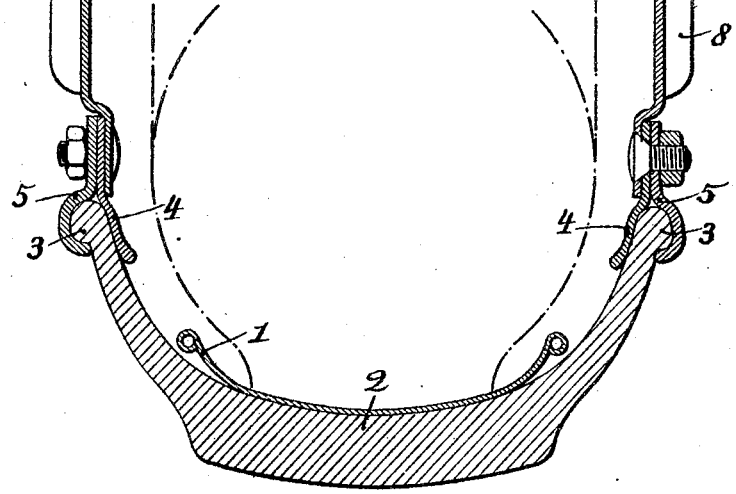
Inventor
L. P. C. Lotte Dec. 8, 1925.

L. P. C. LOTTE

TIRE PROTECTOR

Filed May 20, 1924

Inventor
L.P.C. Lotte
by Langner, Parry, Card & Langner
Attys.

Patented Dec. 8, 1925.

1,565,172

UNITED STATES PATENT OFFICE.

LUCIEN PAUL CÉLESTIN LOTTE, OF PARIS, FRANCE.

TIRE PROTECTOR.

Application filed May 20, 1924. Serial No. 714,714.

*To all whom it may concern:*

Be it known that I, LUCIEN PAUL CÉLESTIN LOTTE, a citizen of the Republic of France, and residing at Paris, Seine Department, No. 57 Boulevard Pereire, in the Republic of France, industrial, have invented certain new and useful Improvements in Tire Protectors, of which the following is a specification.

My invention has for its object an efficient and practical tire protector, of the type in which the usual vehicle wheel rolls upon the inner surface of a ring of larger diameter.

The appended drawing shows by way of example a constructional form of tire according to the invention, as well as modifications of certain parts of the same.

Fig. 1 is a diagrammatic vertical section of the whole arrangement of the wheel with its protector.

Fig. 2 is a transverse section of the protector on a larger scale.

Figure 4:
Fig. 4 is a cross-section of another form of rolling rings.
Figure 5:
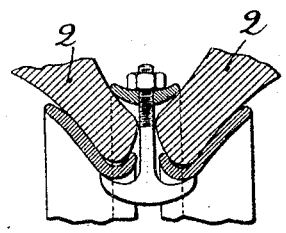
Fig. 5 shows the details relative to pairs of wheels.
Figure 3:
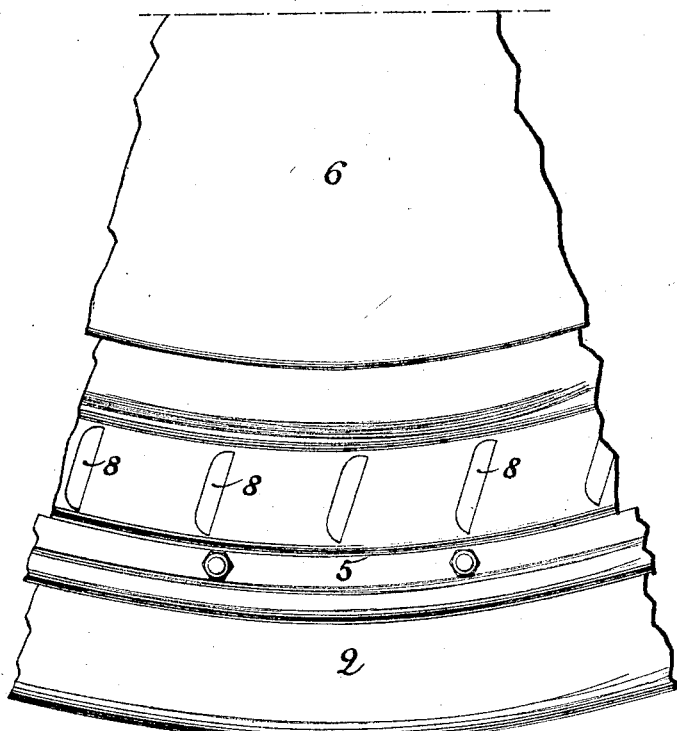
Fig. 3 is a corresponding partial elevation.

The said protector, Fig. 2, consists essentially of an annular roller path 1 which is employed for the tire to be protected and whose diameter is appreciably larger than the diameter of the said tire, the same being made of sheet or strip steel, and preferably bent according to the shape of the tire; its width is just sufficient in order that the usual pneumatic tire may roll thereupon with a transverse play varying from one to several centimeters, according to the width. This transverse displacement is essential, because when combined with the other arrangements to be further described it will prevent the side slipping of the vehicle. The thickness of the roller path is exactly what is necessary in order that the said ring, at the points at which it is subjected to the action of road obstacles, shall only undergo slight and temporary distortions due to the elasticity of the metal composing the same, without being altered by permanent distortions. Its outline is just sufficient to prevent the tire from leaving the same when rotating, by passing over its edges.

The said roller path is entirely surrounded by a rubber tire 2 whose cross section, having the outline shown in Fig. 2, is well separated from the sides of the flanges of the roller path 1, and this will counteract the "fish-bone" shearing of the tire 2 by sharp-edged obstacles coming against its sides. The roller path itself is mounted within the tire 2 in such manner that since its outer diameter is somewhat larger than the inner diameter of the tire 2, there will be a certain pressure or at least a constant contact between these two parts.

The diameter of the rings formed by the edges or beads 3 of the tires should be such that the said rings will allow the wheel with its inflated tire to enter the said arrangement with facility.

It is important to observe that the thin parts of the wall of the tire 2 situated between the roller path 1 and the bead 3 will thus form a connection, which is perfectly elastic in all directions, between the roller path 1 and the guide cheeks 6 secured to the beads.

The beads 3 are held between two metal rings (preferably of iron) which are pressed together by suitable means, and whereof one—preferably situated in the interior of the tire—supports (for example by riveting) a guide cheek which is constituted as will be further set forth. It is important that the arrangement surrounding the wheel shall be guided in such manner that the said arrangement may without undue departure from the mean vertical position afford a suitable transverse displacement of the said tire upon its roller path, and without any abnormal effects of friction.

The said tire should be brought back to its proper position on the roller path in an analogous manner to what prevails in the case of a belt which is brought back to the convex part of a pulley, which effect is facilitated if required by the outline given to the roller path 1. So that the lateral motion of the lower parts of the arrangement should not be hindered, whilst the motion of the upper part should be particularly independent of the position of the wheel. Otherwise stated, it is essential for the good working of the arrangement that the protector should be guided with reference to the wheel solely by the upper part of said wheel, Fig. 1. By this means I not only prevent the side slipping of the vehicle but also facilitate the turning on the road by causing the arrangement to follow the motion of the front wheels only in a progressive manner, and I further attenuate the effects of prejudicial jarring due to obstacles encountered at a certain angle.

It is further necessary that the guiding device should not comprise moving parts, that it should have an absolutely noiseless operation, that it should be very light and should be exempt from all abrupt action, while on the contrary it should have a certain inherent elasticity. I obtain all these results by constituting the guiding element by the annular cheeks 6, for example of aluminium, connected with the rings 4 and 5, and so shaped that an annular decreased portion 7 situated near the inner edge will form an restricted passage in which the upper part of the pneumatic tire to be protected will be situated, with a restricted play which is much less than what is given to the wheel with respect to the roller path 1.

The position of the decreased portion 7 is so determined that the guiding will take place place by the direct contact between the widest part of the pneumatic tire and the said cheek. Since the cheek and the pneumatic tire have different speeds at the point of contact, the said cheek must be made of or at least faced with a soft metal which will not occasion a wear of the India rubber, such as copper or aluminium, the latter being preferred by reason of its lightness. In this manner, the contact between the tires and the cheek will produce no noise. The elasticity and the flexibility of the thin lateral wall of the roller path will also have an effect in order to provide all desired flexibility for the said guiding means, and I consider it essential for the good working of a tire protector of this type that the guiding should take place as described, by means of rigid metallic cheeks connected with the roller path 1 properly so called by elastic connections admitting a flexibility in the transverse direction.

It is also essential that the same connections should allow a longitudinal elasticity and flexibility, i. e. in the plane of the wheel itself, since this will lessen the jarring of the said roller path and of the wheel in the forward travel. It is certain that in these jarring effects, the mass of the rings 4 and 5, of the cheeks 6 and the cap 9 will enter but little into the action, by reason of the elasticity of the thin parts of the tire 2 in the direction of motion of the wheel.

The said walls will introduce a discontinuity between the metallic parts of the apparatus, so that the vibrations occasioned in the roller path for example when obstacles are met with will not be imparted to the cheeks, and vice versa. For this reason, the said arrangement will afford an absolutely silent working throughout the whole of the apparatus. It is further essential to reduce the heat which may be produced in the interior of the arrangement by reason of friction or distortion, and whose accumulation would have a destructive effect upon the protector and the pneumatic tires. To this end, the said cheeks are pierced at the parts which are never in contact with the pneumatic tire; the said wings thus move at a linear speed which is about twice the speed of the vehicle. The strong blast thus produced will cool the roller path and the pneumatic tire and will also drive out all dust, water and even small gravel which may have entered the device, and the latter is completely dried by the heat due to the rolling motion.

The two cheeks are of like form, except that in certain cases the wings 8 may be provided upon only one cheek. Being of annular shape, they have a large central opening; in the case of the outer cheek, this opening is closed by a cap 9 having a suitable shape in order to allow the free motion of the wheel hub, and secured to the cheek for instance by a bayonet joint so directed that the rotation will tend to hold it in position. This arrangement provides for a ready inspection of the wheel (air filling and condition of the hub) and the wheel can also be removed with facility.

Obviously, when traveling upon sandy or muddy roads, the tire 2 may have at the part in contact with the ground an enlarged surface after a certain degree of sinking into the soil, Fig. 4, or a surface which is suitably roughened, not shown.

Claims—

1. A protector for wheel tires comprising two annular cheeks, an external roller path of flexible material and of U cross section, the outer edges of the said cheeks being secured to the edges of said roller path, and an internal roller path of metal disposed against the inner wall of the said roller path of flexible material, the edges of the said internal roller path being inwardly curved in such manner as to be separated from the inner wall of the roller path of flexible material.

2. The combination of a tire protector comprising two annular cheeks, an external roller path consisting of a flexible substance and having a U cross section, the external edges of the said cheeks being secured to the edges of the said roller path, and an internal roller path, consisting of metal which is disposed against the internal wall of the said roller path of flexible material, and a wheel with pneumatic tire adapted to roll upon the internal face of the said metallic roller path, the diameter of said wheel being smaller than that of the said metallic roller path, the internal surface of said metallic roller path having a cross section of such a shape as to assure the lateral displacements of the said wheel between these edges.

3. The combination of a tire protector comprising two annular cheeks, an external roller path consisting of a flexible substance such as rubber and having a U cross section, the external edges of the said cheeks being secured to the edges of the said external roller path, and an internal roller path consisting of metal which is disposed against the internal wall of the said external roller path, and a wheel with pneumatic tire adapted to roll upon the internal face of the said metallic roller path, the diameter of the said wheel being smaller than that of the said metallic roller path, said external roller path having a thick cross section at the middle, and a thin and flexible cross section at the edges, these flexible edges being alone adapted to connect the internal roller path to the cheeks of the apparatus.

4. A protector for wheel tires comprising two annular cheeks, an external roller path of flexible material and of U cross section, the outer edges of the said cheeks being secured to the edges of said roller path, and an internal roller path of metal disposed against the inner wall of the said roller path of flexible material, the edges of the said internal roller path being inwardly curved in such manner as to be separated from the inner wall of the roller path of flexible material, the said cheeks having a stepped transverse outline whereby the space between the cheeks shall be narrower in the part adjacent the inner edge of the cheeks than in the part adjacent the periphery of the same.

5. A protector for wheel tires comprising two annular cheeks, an external roller path of flexible material and of U cross section, the outer edges of the said cheeks being secured to the edges of said roller path, and an internal roller path of metal disposed against the inner wall of the said roller path of flexible material, the edges of the said internal roller path being inwardly curved in such manner as to be separated from the inner wall of the roller path of flexible material, said cheeks having apertures for the passage of air and inclined projecting members or wings extending outwardly of the said apertures whereby the air is caused to enter the same during the rotation of the protector.

6. A protector for wheel tires comprising two annular cheeks, an external roller path of flexible material and of U cross section, the outer edges of the said cheeks being secured to the edges of said roller path, and an internal roller path of metal disposed against the inner wall of the said roller path of flexible material, the edges of the said internal roller path being inwardly curved in such manner as to be separated from the inner wall of the roller path of flexible material, the edges of the said roller path of flexible material being enlarged in the form of beading, and assembling means comprising at each side of the protector two rings whereof the inner edges are adapted to be placed upon and secured to the outer edge of the respective cheek and the outer edges are adapted to clamp between them the respective bead of the roller path of flexible material.

7. The combination with a wheel provided with a pneumatic tire, of a tire protector comprising two annular cheeks, an external roller path of flexible material and of U cross section, the outer edges of the said cheeks being secured to the edges of said roller path, and an internal roller path of metal disposed against the inner wall of the said roller path of flexible material, the edges of the said internal roller path being inwardly curved in such manner as to be separated from the inner wall of the roller path of flexible material, the inner diameter of said metal roller path being considerably larger than the outer diameter of the wheel including the pneumatic tire, and the said cheeks having a stepped transverse outline whereby the space between the cheeks in the part adjacent the periphery shall be considerably larger than the pneumatic tire of the wheels, and the said space in the portion adjacent the sides of the pneumatic tire at the upper part of the wheel shall be scarcely larger than the said tire.

In testimony that I claim the foregoing as my invention, I have signed my name.

LUCIEN PAUL CELESTIN LOTTE.